(12) United States Patent
Lichtner et al.

(10) Patent No.: US 8,286,389 B2
(45) Date of Patent: Oct. 16, 2012

(54) FLANGE WEATHERSTRIP ATTACHMENT

(75) Inventors: Jeff Lichtner, Dearborn, MI (US); Todd William Dishman, Detroit, MI (US); Tracy Christopher Bakos, Ann Arbor, MI (US); Dustin Michael Hall, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 12/683,591

(22) Filed: Jan. 7, 2010

(65) Prior Publication Data

US 2011/0162285 A1   Jul. 7, 2011

(51) Int. Cl.
  *E06B 7/16*      (2006.01)
  *E06B 7/23*      (2006.01)
(52) U.S. Cl. ............... 49/490.1; 49/492.1; 49/475.1
(58) Field of Classification Search ........... 49/475.1, 49/490.1, 492.1, 498.1
See application file for complete search history.

(56) References Cited

U.S. PATENT DOCUMENTS

| | | | | |
|---|---|---|---|---|
| 2,554,452 | A | * | 5/1951 | Bright ............ 49/490.1 |
| 2,664,602 | A | * | 1/1954 | Bright ............ 49/490.1 |
| 4,263,750 | A | * | 4/1981 | Hein ............ 49/490.1 |
| 4,970,102 | A | * | 11/1990 | Guillon ............ 428/122 |
| 5,288,121 | A | | 2/1994 | Graves |
| 5,519,968 | A | | 5/1996 | Dupuy |
| 5,783,312 | A | * | 7/1998 | Laughman et al. ............ 428/573 |
| 6,082,048 | A | * | 7/2000 | Backes et al. ............ 49/377 |
| 6,247,271 | B1 | * | 6/2001 | Fioritto et al. ............ 49/490.1 |
| 6,293,619 | B1 | * | 9/2001 | Iimori et al. ............ 296/216.09 |
| 6,647,667 | B2 | * | 11/2003 | Mine et al. ............ 49/490.1 |
| 6,849,310 | B2 | * | 2/2005 | Willett ............ 428/31 |
| 6,874,281 | B2 | * | 4/2005 | Fujita et al. ............ 49/490.1 |
| 7,082,721 | B2 | * | 8/2006 | Whitehead ............ 49/490.1 |
| 2001/0027622 | A1 | * | 10/2001 | Mine et al. ............ 49/490.1 |
| 2003/0188491 | A1 | * | 10/2003 | Aritake ............ 49/490.1 |
| 2004/0040215 | A1 | * | 3/2004 | Fujita et al. ............ 49/490.1 |
| 2004/0060242 | A1 | * | 4/2004 | Coldre et al. ............ 49/490.1 |
| 2004/0111973 | A1 | * | 6/2004 | Moisy et al. ............ 49/490.1 |
| 2005/0144849 | A1 | | 7/2005 | Boutin |
| 2005/0198908 | A1 | * | 9/2005 | Imaizumi et al. ............ 49/490.1 |
| 2008/0178532 | A1 | * | 7/2008 | Leung ............ 49/490.1 |

FOREIGN PATENT DOCUMENTS

| | | | |
|---|---|---|---|
| CA | 487371 A | | 10/1952 |
| EP | 0368522 A2 | | 10/1989 |
| GB | 649137 | * | 4/1951 |
| GB | 2351539 A | | 1/2001 |

* cited by examiner

*Primary Examiner* — Katherine W Mitchell
*Assistant Examiner* — Justin Rephann
(74) *Attorney, Agent, or Firm* — James Dottavio; Price Heneveld LLP

(57) ABSTRACT

A seal weatherstrip retention assembly is provided that includes a flange having a lanced segment, wherein the lanced segment extends at an angled pitch away from the flange. Also included is a weatherstrip. The weatherstrip includes a substantially U-shaped channel, wherein the U-shaped channel includes a first sidewall, a second sidewall, and a cap wall. The weatherstrip further includes a retaining member that extends away from the first sidewall, wherein the retaining member is angled to engage the lanced segment.

20 Claims, 2 Drawing Sheets

FLANGE WEATHERSTRIP ATTACHMENT

FIELD OF THE INVENTION

The present invention relates to weatherstriping, and more particularly relates to attaching a weatherstrip to a flange.

BACKGROUND OF THE INVENTION

Weatherstrips are employed to form a seal between various surfaces. This seal is typically located at the perimeter of such surfaces. The perimeter of vehicle panels, for example, such as a flange or plurality of flanges that require such a weatherstrip often varies in thickness, thereby posing challenges when fitting a weatherstrip over the panels. A snug engagement is desired, but is often difficult in light of the variations in thickness.

SUMMARY OF THE INVENTION

According to one aspect of the present invention, a seal weatherstrip retention assembly is provided that includes a flange having a lanced segment, wherein the lanced segment extends at an angled pitch away from the flange. Also included is a weatherstrip. The weatherstrip includes a substantially U-shaped channel, wherein the U-shaped channel includes a first sidewall, a second sidewall, and a cap wall. The weatherstrip further includes a retaining member that extends away from the first sidewall, wherein the retaining member is angled to engage the lanced segment.

According to another aspect of the present invention, a seal weatherstrip retention assembly for a vehicle is provided. The system includes a flange having at least one lanced opening and a spacer, wherein the at least one lanced opening includes a first portion and a second portion, and wherein the spacer extends from the first portion of the at least one lanced opening at an angled pitch away from the flange. Also included is a weatherstrip. The weatherstrip includes a substantially U-shaped channel, wherein the U-shaped channel includes a first sidewall, a second sidewall, and a cap wall. The weatherstrip also includes a retaining member that extends from the first sidewall substantially toward the second sidewall, wherein the retaining member is angled to engageably attach to the spacer, thereby retaining the weatherstrip to the flange.

According to yet another aspect of the present invention, a method of retaining a weatherstrip to a vehicle flange is provided. The method includes the step of providing a flange on a vehicle. Also included is the step of lancing a segment of the flange, wherein a first portion of the segment remains connected to the flange, and wherein a second portion of the segment extends at an angled pitch away from the flange. The method further includes the step of forming a weatherstrip having a substantially U-shaped channel, wherein the U-shaped channel includes a first sidewall, a second sidewall, a cap wall, and a retaining member that extends away from the first sidewall. Furthermore, the method includes the step of placing the weatherstrip over the flange, thereby engageably attaching the retaining member to the segment.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
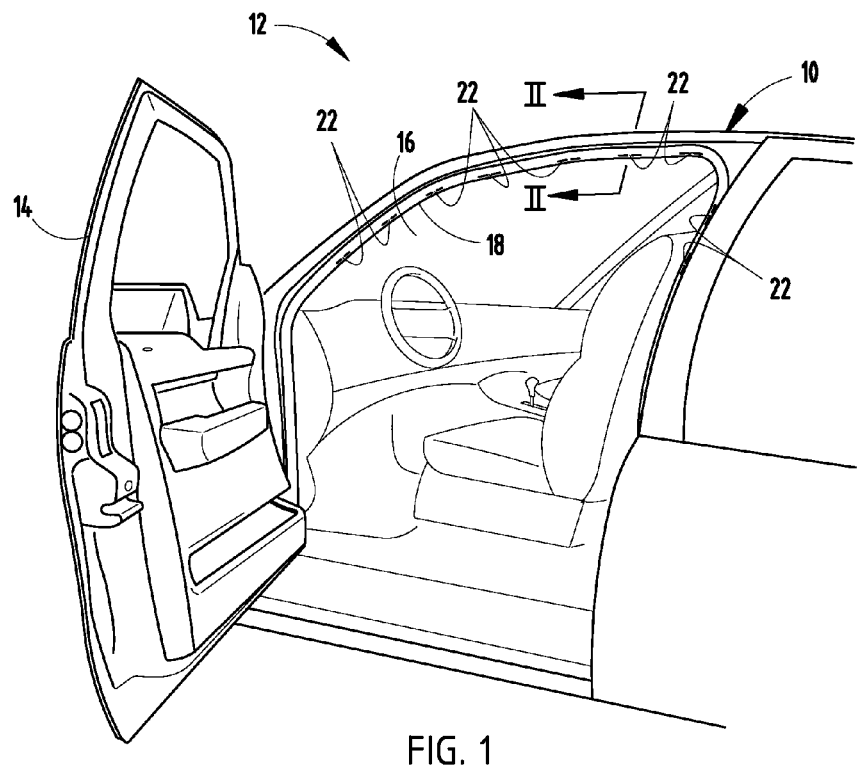
FIG. 1 is an elevational perspective view of an automobile having a door shown in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
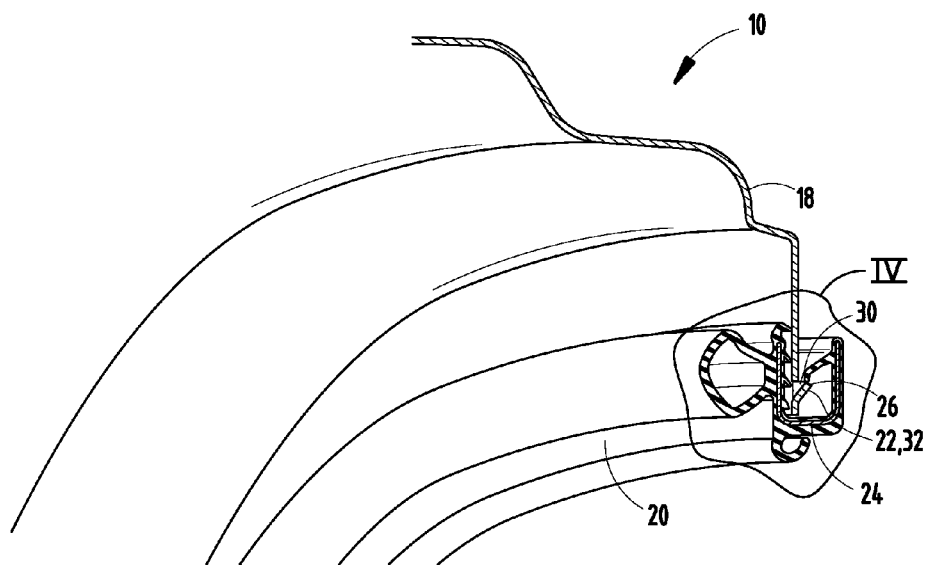
FIG. 2 is an elevational perspective, cross-sectional view of a weatherstrip attached to a flange taken along line II-II of FIG. 1.

Referring to FIGS. 1 and 2, the reference number 10 generally designates a weatherstrip retention feature or assembly for a vehicle such as an automobile. The retention feature 10 includes a flange 18 having a lanced segment 22, wherein the lanced segment 22 extends at an angled pitch away from the flange 18. Also included in the retention assembly 10 is a weatherstrip 20. The weatherstrip 20 includes a substantially U-shaped channel 40, wherein the U-shaped channel 40 includes a first sidewall 42, a second sidewall 44, and a cap wall 46. The weatherstrip 20 further includes a retaining member 48 that extends away from the first sidewall 42, wherein the retaining member 48 is angled to engage the lanced segment 22.

The automobile 12 includes a door 14 that hingedly opens and closes. The door 14 functions to cover a door opening 16, the perimeter of which is substantially defined by at least one flange 18. In a closed position, the door 14 comes into proximity with the at least one flange 18 and a door seal or weatherstrip 20 is attached to the at least one flange 18 in order to provide an effective seal between the door 14 and the door opening 16.

The door opening 16 may include a single gage flange, a multiple gage flange, and/or a plurality of flanges in abutment with one another. Irrespective of the door opening 16 configuration, the door opening 16 flange thickness may typically vary from a thickness of less than one millimeter (1 mm) to a thickness of six millimeters (6 mm). The lanced segment(s) 22 may be a lanced opening 30 that includes a piece of the flange 18 extended away from the flange 18 at an angle. The lanced segment 22 remains connected to the flange 18 at a first portion 24 where the lanced segment 22 was pivoted away from the flange 18, and a second portion 26 that is defined by the portion of the lanced segment 22 distally located from the first portion 24. The desired lanced segment 22 angle or pitch is determined by required spacing, based on the variance of the door opening 16 thickness. Therefore, the lanced segment 22 may be described as comprising a lanced opening 30 defined by the opening 30 in the flange 18, as well as a spacer 32.

Figure 3:
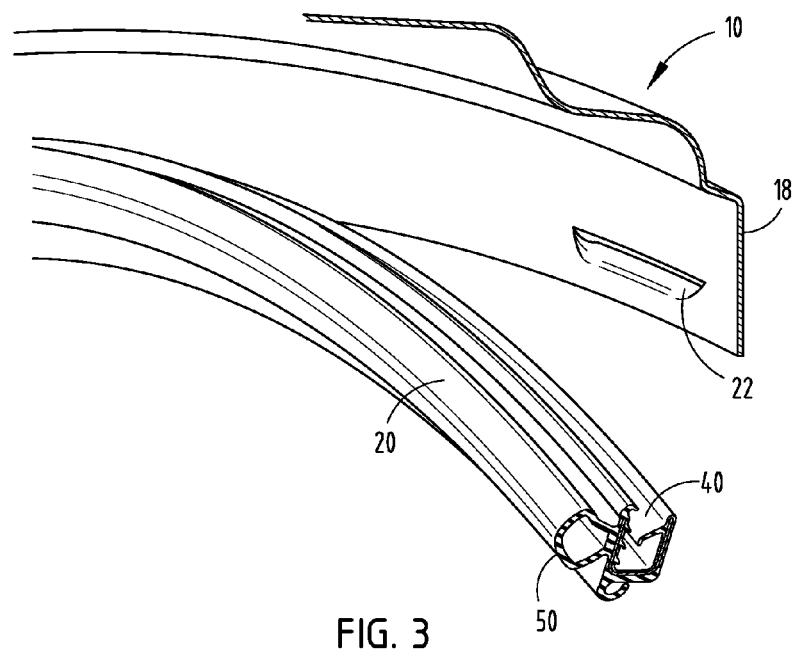
FIG. 3 is an elevational perspective, cross-sectional view of the weatherstrip prior to attachment to a lanced segment of the flange.
Figure 4:
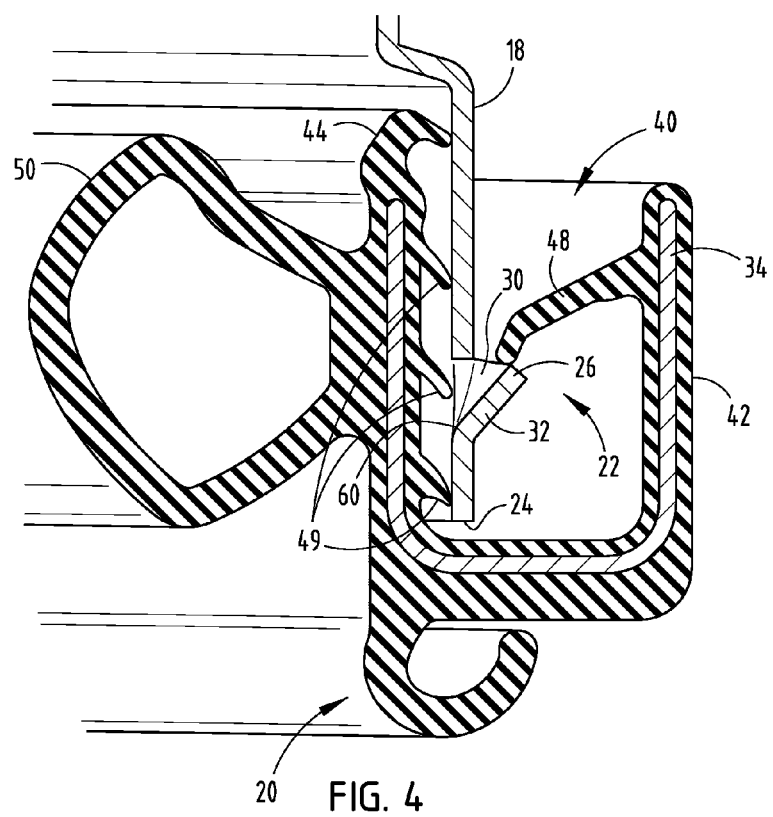
FIG. 4 is an enlarged elevational side, cross-sectional view of the weatherstrip attached to the flange taken along line IV-IV of FIG. 2.

Referring to FIGS. 3 and 4, the spacer 32 provides the ability to retain the weatherstrip 20 to the flange 18 defining the door opening 16, despite the varying thickness. The weatherstrip 20 includes a core or carrier 34 that is encased by a molding or extruding with an elastomeric material. The elastomeric material includes a substantially rigid channel 40 that is substantially U-shaped according to one embodiment; however, alternative configurations may be employed. In the U-shaped channel 40 embodiment, a first sidewall 42 and a second sidewall 44, substantially parallel to one another, are configured to fit around the door opening 16, namely the single gage flange 18. A cap wall 46 connects the first and second sidewall 42, 44 and is aligned substantially perpendicular to the first and second sidewall 42, 44. Disposed generally between the first and second sidewall 42, 44 is a retaining member 48 that is fixedly connected to the first sidewall 42, however connection to the second sidewall 44 is conceivable, according to other embodiments. Regardless of which sidewall 42, 44 the retaining member 48 is connected to, the retaining member 48 extends away from the connection point and is angled to snugly engage the lanced segment 22 of the flange 18, particularly the spacer 32. The second sidewall 42 has a plurality of fingers 49 fixedly connected and angularly extending from the second sidewall 42. The plurality of fingers 49 frictionally engage with the flange 18 opposite the lanced segment 22.

In addition to the substantially rigid channel 40, the weatherstrip 20 also includes at least one hollow, horseshoe or balloon shaped section 50 which is relatively resilient and flexible and achieves a seal against an adjacent portion of the vehicle body when the door 14 is in a closed position. The hollow section 50 is also made of an elastomeric material.

The present invention further provides a method of manufacturing a feature for retaining a weatherstrip 20 to an automobile flange 18. The method includes providing a single gage flange 18, however, it is conceivable that other flange forms may be used, as described above. The flange 18 is then lanced in at least one location, thereby forming a lanced segment 22 of the flange 18. The lancing may be accomplished by stamping, according to one embodiment, where a segment of the flange 18 is separated from the flange 18 and angled away from a pivot point 60 between the flange 18 and the lanced segment 22. The lanced segment 22 extends from a first portion 24, the pivot point 60, at an angle toward a second portion 26 of the lanced segment 22. The pitch angle is determined to accommodate the desired use and may be used for various configurations. The method also includes forming a weatherstrip 20 having a channel 40 and a weatherstrip 20, the structure of which is described above. Finally, the weatherstrip 20 is placed over the flange 18, whereby the retaining member 48 is engageably attached to the lanced segment 22.

Accordingly, the retention assembly advantageously provides a spacing between a vehicle panel and a seal weatherstrip in order to accommodate panel thickness variation around the perimeter of the panel, while also allowing for a snug retention of the seal weatherstrip to the panel, thereby creating an effective seal between the vehicle panel and the vehicle door.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seal retention assembly comprising:
    a flange;
    a lanced segment angularly extending from the flange and having integrally deformed sides and a substantially planar face defining a lanced opening between the face and the flange; and
    a weatherstrip comprising:
        a substantially U-shaped channel, including a first sidewall, a second sidewall, a cap wall, and a core encased within the U-shaped channel; and
        a retaining member angularly extending from the first sidewall and engaging the face.

2. The seal retention assembly of claim 1, wherein the weatherstrip further comprises:
    a plurality of fingers angularly extending from the second sidewall, wherein the plurality of fingers are frictionally engaged with the flange, and wherein the plurality of fingers and the retaining member are comprised of an elastomeric material.

3. The seal retention assembly of claim 1, wherein the flange comprises a metal material and extends around a perimeter of a vehicle door opening.

4. The seal retention assembly of claim 1, wherein the flange comprises a plurality of lanced segments aligned in a longitudinal direction angularly extending from a single side of the flange.

5. The seal retention assembly of claim 1, wherein the weatherstrip comprises an elastomeric material surrounding the core, and wherein the core is substantially rigid relative to the elastomeric material of the weatherstrip.

6. The seal retention assembly of claim 5, wherein the weatherstrip further comprises:
    a hook member having a first portion extending from the cap wall proximate the second sidewall and a second portion curling back toward the cap wall.

7. The seal retention assembly of claim 6, wherein the weatherstrip further comprises a hollow section for engageably sealing a surface, and wherein the hollow section comprises a resilient and flexible material.

8. A seal retention assembly for a vehicle comprising:
    a flange having at least one lanced segment, wherein the at least one lanced segment includes a first portion and a second portion, and wherein the at least one lanced segment pivots away from the flange at the first portion and extends to the second portion at a distal end thereof, forming a lanced opening; and
    a weatherstrip further comprising:
        a substantially U-shaped channel, including a first sidewall, a second sidewall, a cap wall, and a core encased within the U-shaped channel;
        a retaining member angularly extending from the first sidewall substantially toward the second sidewall, wherein the retaining member is angled to engageably attach to the second portion, thereby retaining the weatherstrip to the flange; and
        a hook member having a first portion extending from the cap wall proximate the second sidewall and a second portion curling back toward the cap wall.

9. The seal retention assembly of claim 8, further comprising:
    a plurality of fingers angularly extending from the second sidewall, wherein the plurality of fingers are frictionally engaged with the flange.

10. The seal retention assembly of claim 8, wherein the flange comprises a metal material and extends around a perimeter of a vehicle door opening, and wherein the flange has a plurality of lanced segments aligned in a longitudinal direction angularly extending from a single side of the flange.

11. The seal retention assembly of claim 8, wherein the lanced segment angularly extends from the flange and has integrally deformed sides and a substantially planar face at the distal end thereof that defines the lanced opening between the face and the flange.

12. The seal retention assembly of claim 8, wherein the weatherstrip comprises an elastomeric material.

13. The seal retention assembly of claim 12, wherein the core is substantially rigid relative to the elastomeric material of the weatherstrip.

14. The seal retention assembly of claim 13, wherein the weatherstrip further comprises a hollow section for engageably sealing a surface, and wherein the hollow section comprises a resilient and flexible material.

15. A method of retaining a weatherstrip to a vehicle flange comprising:
   providing a flange on a vehicle;
   lancing a substantially linear opening in the flange and forming a lanced segment that angularly extends from the flange and has integrally deformed sides and a substantially planer face that defines a lanced opening between the face and the flange;
   forming a weatherstrip having a substantially U-shaped channel, comprising a core encased therein, a first sidewall, a second sidewall, a cap wall, a retaining member that extends away from the first sidewall, and a plurality of fingers extending from the second sidewall; and
   placing the weatherstrip over the flange, thereby engageably attaching the retaining member to the face of the lanced segment.

16. The method of claim 15 further comprising the step of lancing a plurality of segments in a longitudinal direction angularly extending from a single side of the flange.

17. The method of claim 15, wherein the flange is a substantially single gage thickness.

18. The method of claim 16 further comprising the step of lancing the plurality of segments along a majority of length of the flange.

19. The method of claim 15, wherein the flange comprises a metal and the weatherstrip comprises an elastomeric material.

20. The method of claim 19, wherein the core is substantially rigid relative to elastomeric material of the weatherstrip.

* * * * *